June 26, 1928. 1,674,843
G. G. SPENCER
STRAIGHT LINE CUTTING MACHINE
Filed June 18, 1927 2 Sheets-Sheet 1
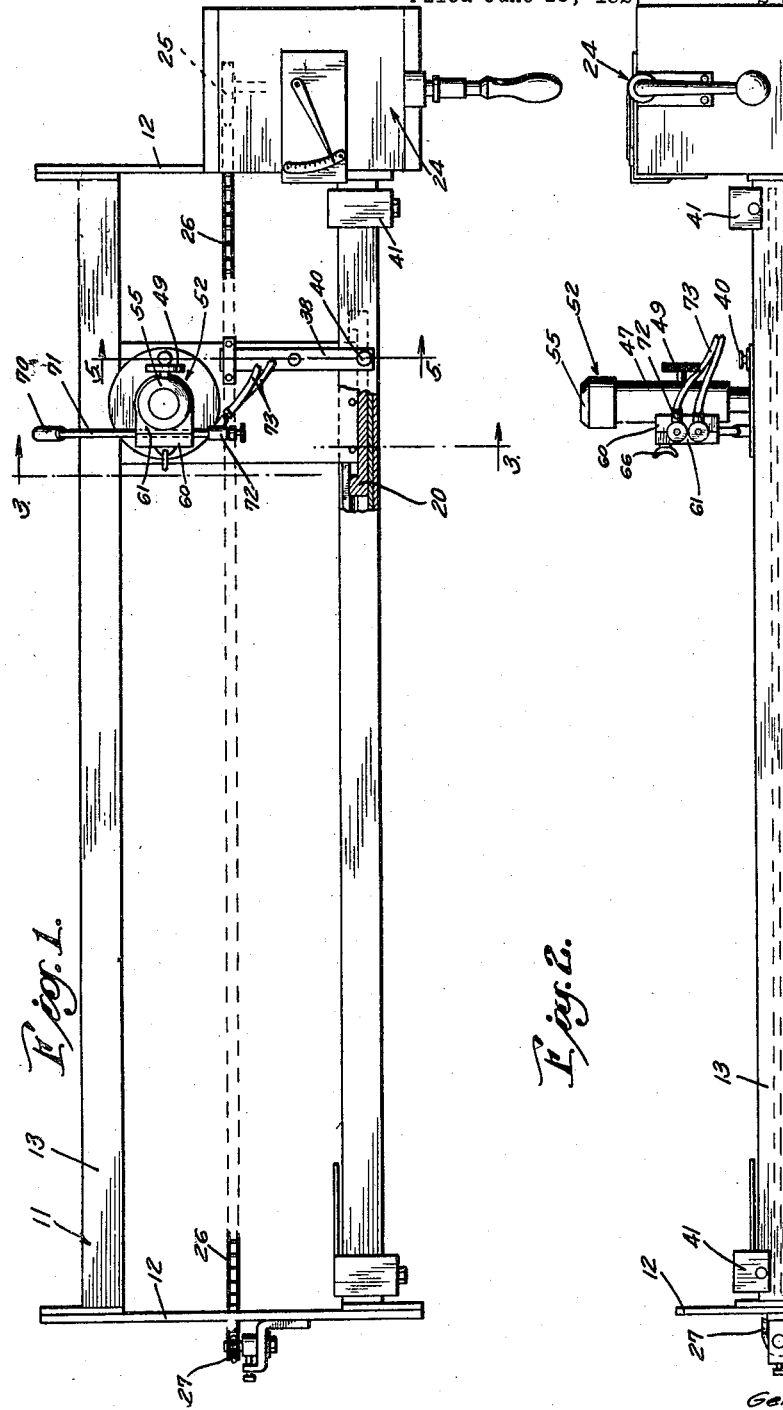

June 26, 1928. 1,674,843
G. G. SPENCER
STRAIGHT LINE CUTTING MACHINE
Filed June 18, 1927 2 Sheets-Sheet 2
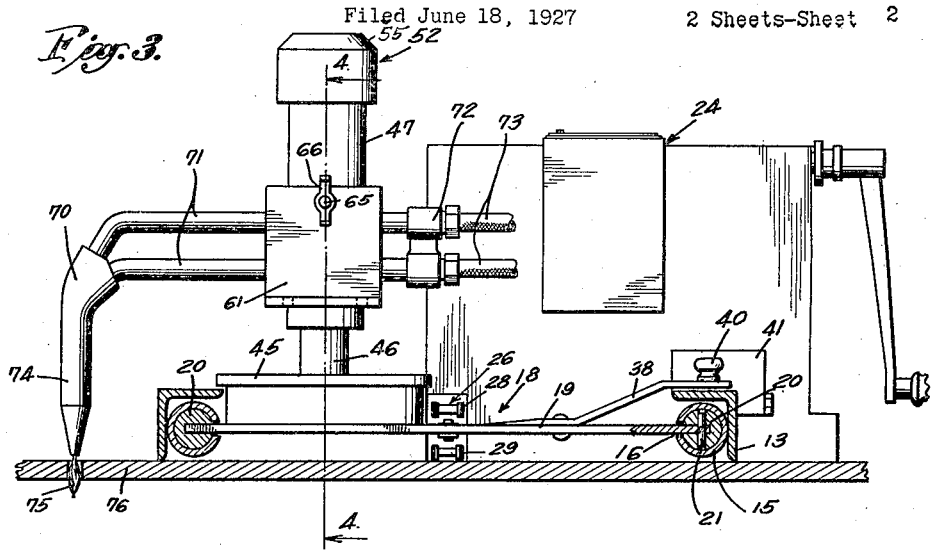
Fig. 3.
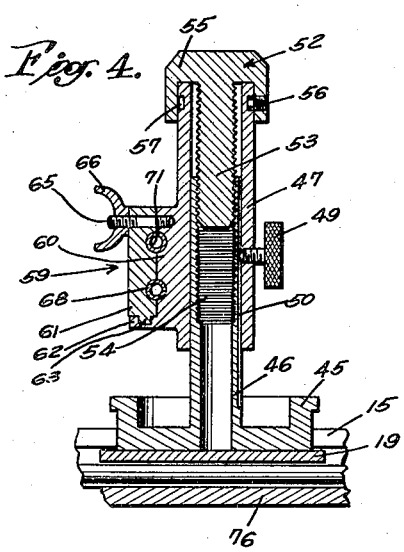
Fig. 4.
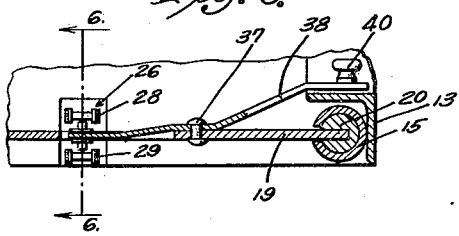
Fig. 5.
Fig. 6.
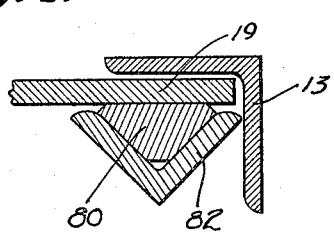
Fig. 7.
INVENTOR
Gerald G. Spencer
By
ATTORNEY Patented June 26, 1928.

1,674,843

UNITED STATES PATENT OFFICE.

GERALD G. SPENCER, OF LOS ANGELES, CALIFORNIA, ASSIGNOR TO PUROX COMPANY, OF DENVER, COLORADO, A CORPORATION OF COLORADO.

STRAIGHT-LINE CUTTING MACHINE.

Application filed June 18, 1927. Serial No. 199,646.

This invention relates to the welding industry and particularly to devices for cutting plates. Since the development of this industry the practice of cutting plates by oxy-acetylene torches has become quite extensive. With suitable apparatus for moving the torch in a straight line and at an even rate of speed, splendid results may be obtained.

It is one of the objects of my invention to provide a device for moving a cutting torch or similar apparatus in a straight line and at an even rate of speed so that an accurate cutting of metal may be obtained.

My invention includes a track along which a carriage may move, this carriage supporting a torch. Means is also provided whereby the carriage may be moved in either direction.

Another object of my invention is to provide a straight-line cutting device of the character mentioned in which the carriage may be releasably connected with the carriage moving means so as to be moved in either direction along the tracks.

A further object of the invention is to provide a device of the character mentioned in which the connecting means for connecting the carriage to the carriage moving means may be automatically released.

A further object of my invention is to provide a device of the nature specified above in which the torch carried thereby is adjustable in a horizontal and also a vertical plane.

Other objects and particular advantages of the invention will be made evident hereinafter.

Referring to the drawings in which the invention is illustrated:

Fig. 1 is a plan view of the invention.

Fig. 2 is an elevational view of Fig. 1.

Fig. 3 is a section taken on the line 3—3 of Fig. 1.

Fig. 4 is a section taken on the line 4—4 of Fig. 3.

Fig. 5 is a section taken on the line 5—5 of Fig. 1.

Fig. 6 is a section taken on the line 6—6 of Fig. 5.

Fig. 7 shows an alternate form of track.

My invention, as illustrated in the drawings, provides a frame 11 consisting of endplates 12 which are connected together by parallel side-bars 13 which are in the form of angles. Upper legs of the angles 13 extend horizontally and toward each other. Placed within the legs of the angles 13 are tracks in the form of tubing 15. The tubing 15 are of uniform internal diameter and extend parallel to each other. The adjacent sides of the tubing 15 are provided with straight slots 16, these slots 16 being in the same horizontal plane as the axes of the tubing.

Adapted to be supported by and to slide along the tubing 15 which comprise the track of the invention is the carriage 18. The carriage 18 has a horizontal plate 19, the opposite edges of which project through the slots 16 into the interior of the tubing 15. As shown best in Figs. 1 and 3, slides 20 are secured to the edges of the platform or plate 19 by pins 21. The slides 20 are in the form of cylindrical bars which are a sliding fit in the tubing 15.

Placed at one end of the frame 11 is the drive mechanism 24 of the invention. In view of the fact that the details of this drive mechanism are not a part of the invention, its interior construction will not be described. The drive mechanism may be any type of apparatus which is capable of operating at a uniform rate of speed and which may have a speed control so that it may be run faster or slower as the work requires. The drive means has a drive sprocket indicated by dotted lines 25 around which an endless belt 26 extends. At the opposite end of the frame 11 is a driven sprocket 27 around which the endless belt 26 also extends. As illustrated best in Figs. 3, 5, and 6, an upper side 28 of the endless belt 26 extends above the platform 19 and a lower part 29 extends below it.

Supported by the platform 19 is an upper engager 31 and a lower engager 32. The upper and lower engagers have pins 33 and have in-bent portions 34 which extend into an opening 35 of the platform 19. Pivoted at 37 to the platform 19 is the operator 38 of the invention. This operator 38 is in the form of a lever. One end of the lever 38 is bent so as to extend into the opening 35 and between the in-bent portions 34 of the engagers 31 and 32. As illustrated best in Fig. 6, the portion indicated by the numeral 39 which extends between the engagers 31 and 32 is so formed that it may have a neutral position between the in-bent portions 34, so that the in-bent portions 34, may be in nonengaging position, as shown. The opposite end of the lever 38 is extended above one of the angles 13 and is provided with a handle 40. By swinging the lever 38 in one direction, the in-bent portion 34 of the upper engager 31 is engaged and the upper engager is moved upward so that the pin 33 thereof extends between the links of the upper side 28 of the endless belt 26. At this time the carriage 18 will be locked to the upper side 28 and will move therewith in the direction in which this upper side 28 is moving. When the lever 38 is moved in the opposite direction the in-bent portion 34 of the lower engager 32 will be engaged and this lower engager will be moved downward so that the pin 33 thereof engages the lower side 29 of the endless belt 26. At this time the carriage will be locked to the lower side and will move in the direction in which the lower side is moving. Stops 41 are placed at opposite ends of the angle 13 over which the end of the lever 38 extends so that the lever 38 may be engaged and moved into neutral position when either end of the track is reached.

Adverting to Figs. 3 and 4, the carriage 18 supports a base 45 from which a vertical column 46 extends. This column 46 is preferably cylindrical and slidably carries the support 47 of the invention. This support 47 surrounds the column 46 and may be moved vertically thereon. A lock-screw or equivalent 49 is provided for locking the support 47 in different vertical positions on the column 46. The inner end of the lock-screw 49 may extend into a groove 50 so that the support cannot rotate relative to the column 46. For the purpose of adjusting the support 47 vertically on the column 46 I provide an adjustment means 52 of the invention. The adjustment means 52 has a central threaded shaft 53 which extends downward into the upper end of the support 47 and screws into a threaded opening 54 of the column 46. The upper end of the adjustment means 52 is provided in the form of a cap 55 which surrounds the upper end of the support 47. The relative vertical movement between the adjustment means and the support is prevented by means of a pin 56 which extends into an annular groove 57 of the support 47. By releasing the lock-screw 49 and rotating the adjustment means 52 in either direction, the support 47 may be raised or lowered on the column 46.

The support 47, as illustrated best in Fig. 4, carries the clamp means 59 of the invention. The clamp means includes a block 60 which may be formed integrally with the support 47, as shown, and a clamp-plate 61 which cooperates with the block 60. The lower part of the block 60 has an ear 62 having an opening into which projections 63 of the clamp-plate 61 may extend. At the upper part of the block 60 there projects a stud 65, this stud extending through an opening in the clamp-plate 61 and having a nut 66 screwed onto the outer end thereof. The block and clamp-plate co-operate to provide horizontal cylindrical openings 68. The clamp means 59 is adapted to support the device which is to be moved in a straight line and at a uniform rate of speed. In this invention the device is in the form of a cutting torch 70. The cutting torch 70 has a pair of gas-supply tubes 71 which extend through the horizontal cylindrical openings 68. Fixtures 72 are provided for connecting gas-supply hose 73 to one end of the tubes 71, and a cutting head 74 is attached at the outer end of the tubes 71. The cutting head 74 projects so that a cutting jet 75 may be projected through a plate of metal 76, which plate of metal is to be cut.

The operation of the invention just described is as follows:

The frame 11 is designed so that it may rest on a table, or if used for cutting large flat plates may rest on the plate itself as illustrated in Fig. 3. The first operation is to properly position the apparatus so that the head 74 of the torch 70 will move along the line on which the plate 76 is to be cut. At this time the torch may be adjusted horizontally by loosening the nut 66 so that the clamp means reduces its grip on the tube 71, and the torch may be moved vertically by loosening the lock-screw 49 and operating the adjustment means so that the support is moved up or down. The next step is to set the carriage in a proper position along the track so that the head of the torch 74 will rest over the point where the cut is to be started. The drive means 24 is then set into operation and adjusted so as to run at a proper rate of speed. The torch will then be put into operation and the operator will swing the lever 38 so that either the upper or lower engager 31 or 32 will engage the endless belt 26 so that the carriage 18 will be moved in the proper direction. The carriage when connected with either the upper or lower part of the chain will move therewith at the same rate of speed as the chain and the torch 70 will be moved in a straight line at a uniform rate of speed. The jet 75 of the torch cuts the metal 76. The stop 41 at the end of the plate where the cut is to finish is adjusted so that it will engage the lever 38 and move it into neutral position, so that the torch will stop at the proper place.

It will be seen that the carriage is adapted to move in either direction and may be stopped at any point. The stops 41 may be slid into suitable positions along the angle 13 which supports them.

The important features of the invention may be briefly enumerated as follows: It is very important to the invention that the carriage be moved in a straight line. The supporting means consisting of the tubes 15 and the slides 20 is a very satisfactory guide means for the invention. The means for selectively moving the carriage in either direction is important to the invention. The endless belt and the engagers which constitute this mechanism is very satisfactory for this purpose. It is very essential that there be automatic stopping means, as provided by this invention; otherwise the operator would have to pay the strictest of attention to the stopping of the machine. The means for adjusting the torch into various horizontal and vertical positions is a valuable part of the invention.

In Fig. 7 I illustrate a modified form of track structure in which the horizontal plate 19 has a sliding V block 80 attached to the under-side thereof and adapted to slide in a channel formed by a strip of angle-iron 82. This type of guide is advantageous in some instances in that the V block 80 is always centralized in the angle-iron 82 regardless of the wear caused by the sliding action. This type of guide also gives a very smooth straight-line motion to the carriage.

I claim as my invention:

1. In a straight-line cutting device: a track; a carriage movable along said track; an endless belt adjacent to said carriage; drive means for moving said endless belt in one direction; and engaging means for connecting said carriage to either side of said endless belt for moving said carriage in either direction along said track.

2. In a straight-line cutting device: a track; a carriage movable along said track; an endless belt adjacent to said carriage; drive means for moving said endless belt in one direction; engaging means for connecting said carriage to either side of said endless belt for moving said carriage in either direction along said track; a column carried by said carriage; a support movable on said column; a torch disposed on said support; and adjustment means rotatable on said support for moving said support on said column.

3. A combination as defined in claim 2 in which said support is provided in the form of a sleeve which surrounds said column, and said adjustment member includes a rotatable cap and a screw which is threadedly engaged with said column.

4. In a straight-line cutting device: a track; a carriage movable along said track; an endless belt adjacent to said carriage; drive means for moving said endless belt in one direction; engaging means for connecting said carriage to either side of said endless belt for moving said carriage in either direction along said track; a column carried by said carriage; a support movable on said column; adjustment means rotatable on said support for moving said support on said column; a torch carried by said support; and means for adjusting said torch into various horizontal positions on said support.

5. In a straight-line cutting device: a track; a carriage movable along said track; an endless belt adjacent to said carriage; drive means for moving said endless belt in one direction; engaging means for releasably connecting said carriage to either side of said endless belt for moving said carriage in either direction along said track; a vertical column carried by said carriage; a support movable on said column; and adjustment means rotatable on said support for moving said support on said column.

6. In a straight-line cutting device: a track; a carriage movable along said track, said track provided in the form of parallel tubing having slots cut in the adjacent sides thereof, said carriage being provided with slide rods which rest in the interior of said tubing; an endless belt adjacent to said carriage; drive means for moving said endless belt in one direction; and engaging means for connecting said carriage to either side of said endless belt for moving said carriage in either direction along said track.

7. In a straight-line cutting device: a frame comprising parallel side bars; a track; a carriage movable along said track; an endless belt adjacent to said carriage; drive means for moving said endless belt in one direction; engaging means for connecting said carriage to either side of said endless belt for selectively moving said carriage in either direction along said track; and stop means on said side bars for releasing said engaging means when said carriage has reached either end of said track.

8. A combination as defined in claim 1 in which said engaging means includes a lever having engagers adapted to engage either side of said endless belt, and an operator for causing the engagement of either of said engagers with said endless belt.

9. A combination as defined in claim 1 in which said engaging means includes engagers adapted to engage either side of said endless belt, and an operator for causing the engagement of either of said engagers with said endless belt, and in combination with stop means for returning said operator to neutral position.

In testimony whereof, I have hereunto set my hand at Los Angeles, California, this 13th day of June, 1927.

GERALD G. SPENCER.